United States Patent
Cantini et al.

(10) Patent No.: US 12,108,251 B2
(45) Date of Patent: Oct. 1, 2024

(54) METHOD FOR ADAPTING THE SECURITY SETTINGS OF A COMMUNICATION STATION, COMMUNICATION STATION AND IDENTIFICATION MODULE

(71) Applicant: InterDigital CE Patent Holdings,SAS, Issy-les-Moulineaux (FR)

(72) Inventors: Renato Cantini, Belfaux (CH); Paul Aebi, Munchringen (CH)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/365,042

(22) Filed: Jul. 1, 2021

(65) Prior Publication Data

US 2022/0014919 A1  Jan. 13, 2022

Related U.S. Application Data

(63) Continuation of application No. 15/005,686, filed on Jan. 25, 2016, now Pat. No. 11,153,755, which is a (Continued)

(30) Foreign Application Priority Data

Oct. 4, 2005 (EP) .................................. 05109197

(51) Int. Cl.
*H04W 12/08* (2021.01)
*H04L 9/40* (2022.01)
(Continued)

(52) U.S. Cl.
CPC ......... *H04W 12/08* (2013.01); *H04L 63/0853* (2013.01); *H04L 63/0876* (2013.01);
(Continued)

(58) Field of Classification Search
CPC ..... H04W 12/06; H04W 12/08; H04W 88/02; H04W 8/183; H04W 4/24; H04W 48/02;
(Continued)

(56) References Cited

U.S. PATENT DOCUMENTS

| 5,517,014 A | 5/1996 | Iijima |
| 6,091,946 A | 7/2000 | Ahvenainen |

(Continued)

FOREIGN PATENT DOCUMENTS

| EP | 1150531 A2 | 10/2001 |
| EP | 1475978 A1 | 11/2004 |

(Continued)

OTHER PUBLICATIONS

European Search Report dated Feb. 17, 2006 for European Patent Application No. EP 05109197.3.
(Continued)

*Primary Examiner* — Allahyar Kasraian
(74) *Attorney, Agent, or Firm* — Flaster Greenberg P.C.

(57) ABSTRACT

A method for adapting the security settings of a communication station (12) depending on a security relevant event is disclosed, wherein the communication station (12) comprises a mobile terminal (16) with an identification module (18). In a first step, the security relevant event occurring in said communication station and/or said mobile terminal (16) is identified in an event handler (26, 26₁, 26₂, 27) and stored in an event registry (28). In a second step, a security registry (30) in the identification module (18) is updated according to the identified event. In a third step, the security level of the communication station (12) and/or the mobile terminal (16) is adapted according to the security registry (30) of the identification module (18). The invention also relates to a communication station (12) and to an identification module (18).

20 Claims, 6 Drawing Sheets

Related U.S. Application Data continuation of application No. 14/327,262, filed on Jul. 9, 2014, now Pat. No. 9,276,961, which is a continuation of application No. 11/542,507, filed on Oct. 3, 2006, now Pat. No. 8,792,858.

(51) Int. Cl.
  *H04W 8/18* (2009.01)
  *H04W 12/00* (2021.01)
  *H04W 12/06* (2021.01)
  *H04W 12/128* (2021.01)
  *H04W 88/02* (2009.01)

(52) U.S. Cl.
  CPC ............ *H04L 63/105* (2013.01); *H04L 63/20* (2013.01); *H04W 8/183* (2013.01); *H04W 12/00* (2013.01); *H04W 12/06* (2013.01); *H04W 12/128* (2021.01); *H04L 63/1416* (2013.01); *H04L 63/1466* (2013.01); *H04W 88/02* (2013.01)

(58) Field of Classification Search
  CPC ..... H04W 48/16; H04W 48/18; H04W 4/003; H04L 63/0853; H04L 63/0892; H04M 2207/18; H04M 2250/14
  See application file for complete search history.

(56) References Cited

U.S. PATENT DOCUMENTS

| | | | |
|---|---|---|---|
| 6,092,133 A | 7/2000 | Erola et al. | |
| 6,119,020 A | 9/2000 | Miller et al. | |
| 6,148,192 A | 11/2000 | Ahvenainen | |
| 6,216,014 B1 | 4/2001 | Proust et al. | |
| 6,230,002 B1 | 5/2001 | Floden et al. | |
| 6,295,446 B1 | 9/2001 | Rocha | |
| 6,367,014 B1* | 4/2002 | Proust | H04L 9/3242 380/247 |
| 6,466,779 B1 | 10/2002 | Moles et al. | |
| 6,657,538 B1* | 12/2003 | Ritter | H04W 12/069 340/5.82 |
| 6,859,650 B1 | 2/2005 | Ritter | |
| 6,961,587 B1 | 11/2005 | Vilppula et al. | |
| 7,304,570 B2 | 12/2007 | Thomas et al. | |
| 7,324,975 B1 | 1/2008 | Grellier | |
| 7,757,094 B2* | 7/2010 | Krishnan | H04W 52/028 713/300 |
| 7,766,237 B2* | 8/2010 | Sakamoto | H04M 1/72412 235/492 |
| 8,554,889 B2 | 10/2013 | Holtz et al. | |
| 2002/0137545 A1 | 9/2002 | Nachef | |
| 2003/0012382 A1 | 1/2003 | Ferchichi et al. | |
| 2004/0059915 A1 | 3/2004 | Laniepce et al. | |
| 2004/0116109 A1* | 6/2004 | Gibbs | H04W 24/00 455/418 |
| 2004/0166839 A1 | 8/2004 | Okkonen et al. | |
| 2004/0172370 A1 | 9/2004 | Bidan et al. | |
| 2004/0180657 A1 | 9/2004 | Yaqub et al. | |
| 2004/0266395 A1 | 12/2004 | Pailles et al. | |
| 2005/0021875 A1 | 1/2005 | Bouthemy et al. | |
| 2005/0083883 A1 | 4/2005 | Ho et al. | |
| 2005/0101323 A1 | 5/2005 | De Beer | |
| 2005/0181805 A1 | 8/2005 | Gallagher | |
| 2005/0207562 A1 | 9/2005 | Nachef et al. | |
| 2006/0052100 A1 | 3/2006 | Almgren | |
| 2006/0094467 A1 | 5/2006 | Kim et al. | |
| 2006/0121882 A1 | 6/2006 | Zhao et al. | |
| 2006/0129838 A1 | 6/2006 | Chen et al. | |
| 2006/0156388 A1* | 7/2006 | Stirbu | H04L 63/0807 726/4 |
| 2006/0277312 A1 | 12/2006 | Hirsch | |
| 2006/0287004 A1 | 12/2006 | Fuqua | |
| 2007/0054655 A1 | 3/2007 | Fantini et al. | |
| 2007/0198834 A1 | 8/2007 | Ksontini et al. | |
| 2007/0259678 A1 | 11/2007 | Kuk et al. | |
| 2008/0107269 A1 | 5/2008 | Gehrmann et al. | |

FOREIGN PATENT DOCUMENTS

| | | | |
|---|---|---|---|
| EP | 1478196 A2 | 11/2004 | |
| GB | 2365699 A * | 2/2002 | ............ G06Q 20/32 |
| WO | WO 2000/067212 A1 | 11/2000 | |
| WO | 200108435 A1 | 2/2001 | |
| WO | WO 2001/008435 A1 | 2/2001 | |
| WO | 2004091165 A1 | 10/2004 | |
| WO | WO 2005076726 A2 | 8/2005 | |

OTHER PUBLICATIONS

WO 2001/008435 A1, Previously cited in Information Disclosure Statement, filed Jul. 1, 2021, in U.S. Appl. No. 17/365,042.
WO 2000/067212 A1, U.S. Pat. No. 7,324,975.

* cited by examiner

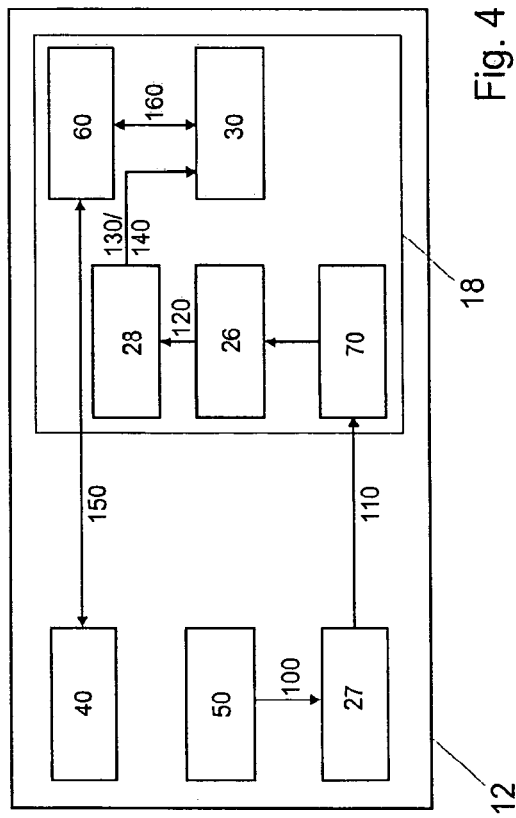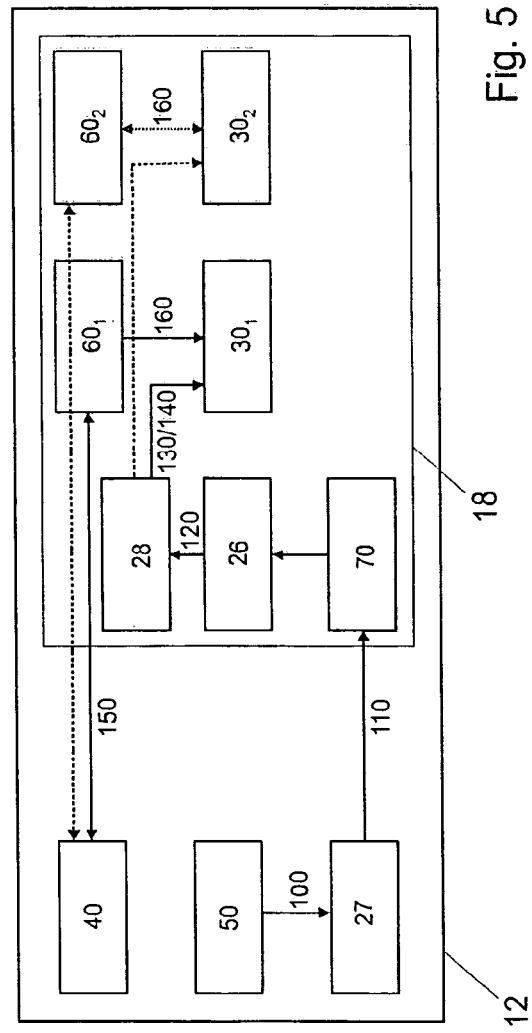

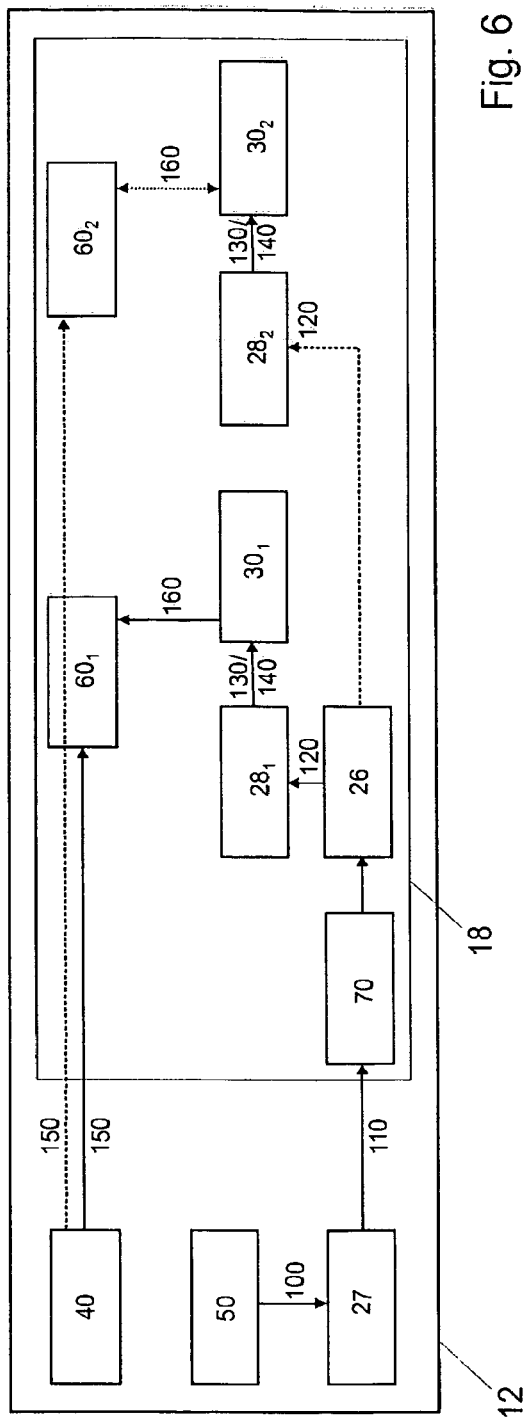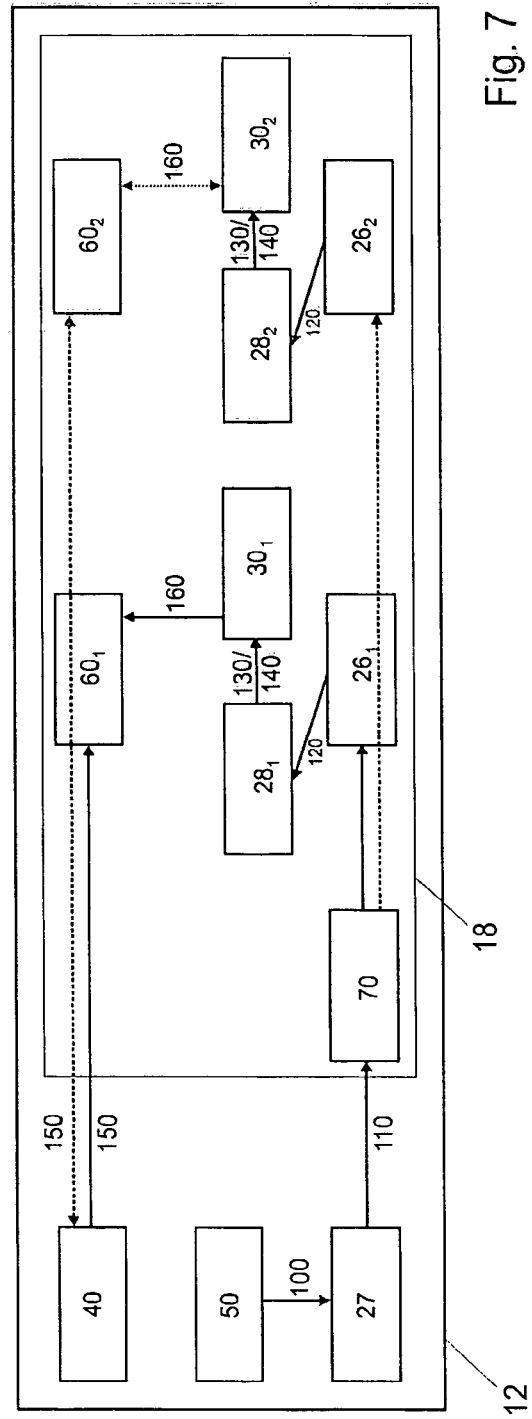

METHOD FOR ADAPTING THE SECURITY SETTINGS OF A COMMUNICATION STATION, COMMUNICATION STATION AND IDENTIFICATION MODULE

CLAIM OF PRIORITY

This application is a continuation of U.S. patent application Ser. No. 15/005,686, filed Jan. 25, 2016, which is a continuation of U.S. patent application Ser. No. 14/327,262, filed Jul. 9, 2014 (U.S. Pat. No. 9,276,961), which is a continuation of United States patent application Ser. No. 11/542,507, filed Oct. 3, 2006 (U.S. Pat. No. 8,792,858), which in turn claims the benefit of priority from prior European (EP) Patent Application Serial No. 2005EP-109197, filed Oct. 4, 2005. Each of above stated applications is hereby incorporated herein by reference in its entirety.

TECHNICAL FIELD OF THE INVENTION

The present invention concerns a method for adapting the security settings of a communication station comprising a workstation and a mobile terminal having an identification module, a communication station and an identification module of the mobile terminal according to the independent claims.

DESCRIPTION OF RELATED ART in the prior art, different access control mechanisms for e.g. regulating the access control of an application, to data or a device are described in the documents WO-A1-00/67212, U.S. Pat. No. 5,517,014 or 6,216,014.

Furthermore, US-A1-2004/172370 relates to access rules of compliance of subjects with objects with a predetermined security policy in a chip card. Each access rule defines the right of a subject to carry out an action on an object. The security policy defines the security rules for access of the subjects to the objects. For an operation relating to a given object, at least one access rule relating to the given object is compared with the security rules in order to accept the operation when the access rule is in compliance with all the security rules; if this is not the case, the operation is refused. An operation can be the loading of an object such as an application, a modification of the access rules, the deletion or addition of a subject, or a request for access to a given object by a subject or a group of subjects.

EP-A1-1 475 978 discloses the details of an apparatus and method for handling simultaneous universal terrestrial radio access network (UTRAN) radio resource control procedures which change the security configuration in a universal mobile telecommunications system (UMTS) user equipment. According to one aspect of the disclosure, a user equipment apparatus having a message handler, a sequential processor, a command store, and a security configuration change detector is provided. Said message handler is coupled to said command store to said sequential processor, and to said security configuration change detector to save, process, and detect configuration changes in commands respectively, and to determine if there is an existing command at the user equipment, such that the user equipment appears to the UTRAN as though it were processing commands simultaneously. According to another aspect, a method is provided for processing simultaneous commands at a user equipment having a security configuration, including the steps of: determining if there is an existing command at the user equipment; upon reception of a received command: suspending the existing command processing; determining if commands contain a security configuration change; and either rejecting the received command or saving the received command prior to resuming the existing command; such that the user equipment appears to the UTRAN to be processing commands simultaneously.

EP-A1-1 478196 refers to a module and method for detecting at least one event in a cellular mobile telephony subscriber equipment, which is based on detecting, when a card enters into operative contact with a terminal of a mobile telephone, whether the code identifying the terminal or the card is the same as the corresponding code read on a previous occasion. If it is not the same, it is understood that a change of terminal or change of card has occurred or that the terminal or card has been used for the first time, and a corresponding message is generated and sent. The code identifying the terminal can be the IMEI, and the code identifying the card can be the IMSI and/or the ICC-ID.

WO-A1-01/08435 relates to a method and associated devices for setting the security level of cryptographic functions used in communication terminals. In a mobile telephone, situation parameters, such as an identification code of a country where the telecommunication terminal is temporarily present, are received in a secured manner from a secure source via a mobile telephone network. In addition, in said telecommunication network, security parameters, such as the maximum acceptable length (in bits) of cryptographic keys, are determined on the basis of the received situation parameters, and said security parameters are used by the cryptographic functions and determine the security level.

In the prior art, under normal conditions, a SIM-card of a mobile station is not aware of any hardware of software changes occurring in the mobile terminal or in a computer connected to the mobile terminal. Changes in the network connectivity or computer lock-down status may occur without informing the SIM card. Therefore, the mobile terminal and/or the associated computer usually implements its own security mechanisms, which is fully independent of the SIM card. This may be detrimental, as applications executed on the SIM card may expose sensitive credentials to an external execution environment. It may thus be desirable to have a SIM card able to impose a security policy. Furthermore, the network operator delivering the SIM card may want to force his subscribers to respect some security mechanisms, or to offer users an easier way of using their communication station safely.

SUMMARY OF THE INVENTION

It is one aim of the present invention to create a method for adapting the security settings of a communication station comprising a mobile terminal having an identification module and to create a corresponding communication station and identification module.

It is another aim of the invention to adapt the security settings of an identification module, such as a SIM-card, to external events, i.e. events occurring outside the SIM card.

According to the invention, these aims are achieved by means of a method for adapting the security settings of a communication station dependent on a security relevant event, the communication station comprising a mobile terminal with an identification module, the method comprising the following steps of:

(a) identifying the security relevant event occurring in said communication station and/or said mobile terminal;

(b) updating a security registry in the identification module according to the identified security relevant event and (c) adapting and enforcing the security settings of the communication station and/or said mobile terminal according to the security registry of the identification module.

According to the invention, these aims are further achieved by means of a communication station comprising a mobile terminal having an identification module, the identification module comprising:

at least one event registry for storing events identified by an event handler, and at least one security registry for adapting and enforcing the security level of the communication station according to the event stored in the event registry.

The Aims are Further Achieved by an Identification Module with Features as Claimed.

According to the present invention, a "security relevant event" comprises one or a plurality of the following actions, which are carried out by the user or any application: change in the hardware configuration of said communication station or mobile terminal, connection of said communication station or mobile terminal to an external network or system, event generated by an application executed by said communication station or mobile terminal and event transmitted over-the-air to said communication station. Some of the possible actions are creating, releasing losing or closing access channels from and to the communication station, locking or unlocking workstation status, removing or installing hardware or software components, an auto run from a device and detecting malicious or suspicious content, traffic or modifications, etc. of course, this is no complete list of all possible events; they are given merely by way of illustration and the invention is by no means restricted to these examples. Any other event which could do harm or be relevant to the user, to the communication station or the mobile terminal could be used. An additional Internet access or WLAN access on a hot spot as mentioned above could be taken into account as well. Said event could include the activity of an antivirus software, an existing firewall and/or an IPSec gateway. The user login status and/or the status of a connection channel implying said communication status could be taken into account as well.

An event is identified by an event handler, which could be provided in the communication station and/or in the mobile terminal. The step of identifying a security relevant event is preferably performed with one or a plurality of the mandatory fields such as event identifier, event type, date and time and/or sequence number and optional fields such as event critical level or event type-specific additional information. After having identified an event and stored the event in an event registry, a security registry is preferably also updated. The security registry sets all security settings of the communication station and for the mobile terminal. The security settings preferably also determine the authentication requirements for an application run by said identification module and/or by said mobile terminal. Said security settings, which are set in the security register, are used to limit the right(s) of a single or of all applications executed by said communication station or mobile terminal.

In an advantageous embodiment, the communication station comprises a computer and a mobile station. The mobile station itself comprises a mobile terminal, for example a cellular phone or a cellular network access card, and an identification module, for example a SIM card. The method of the invention thus comprises a step of adapting the security mechanisms used by the computer and/or by the mobile terminal by looking up a security registry in the identification module, so as to determine the applicable security level.

The identification module (for example a SIM-Card) can be equipped with one shared event handler, event registry and security registry, but it is however also possible to provide a shared event handler and event registry and arrange a single security registry for one or a group of applications. The invention is also applicable with one shared event handler and a single event registry and security registry for one or a group of applications and with a single event handler, event registry and security registry for one or a group of applications.

The advantage with the present invention is that it provides a reasonable balance between security requirements and ease of use and seamlessness needs. For example, an appropriate access to and use of sensitive credentials and functions on the identification module might depend on specific events occurring in the external execution environment. Access control mechanisms on the identification module will be adapted to these specific events by following a relevant security policy defined, stored and retrieved in the identification module.

The method of the invention, thus, limits access to applications in the identification module by the external environment, depending on the security registry.

BRIEF DESCRIPTION OF THE DRAWINGS

The invention will be better understood with the aid of the description of an embodiment given by way of example and illustrated by the figures, in which:

FIG. 4 illustrates a first embodiment of the invention with one shared event handler, event registry and security registry within the SIM Card for all SIM card applications;

FIG. 5 illustrates a second embodiment of the invention with one shared event handler and event registry and a single security registry for one SIM card application;

FIG. 6 illustrates a third embodiment of the invention with one shared event handler and a single event registry and security registry for one SIM card application and FIG. 7 illustrates a fourth embodiment of the invention with a single event handler, event registry and security registry for one SIM card application.

DETAILED DESCRIPTION OF POSSIBLE EMBODIMENTS OF THE INVENTION

Figure 1A:
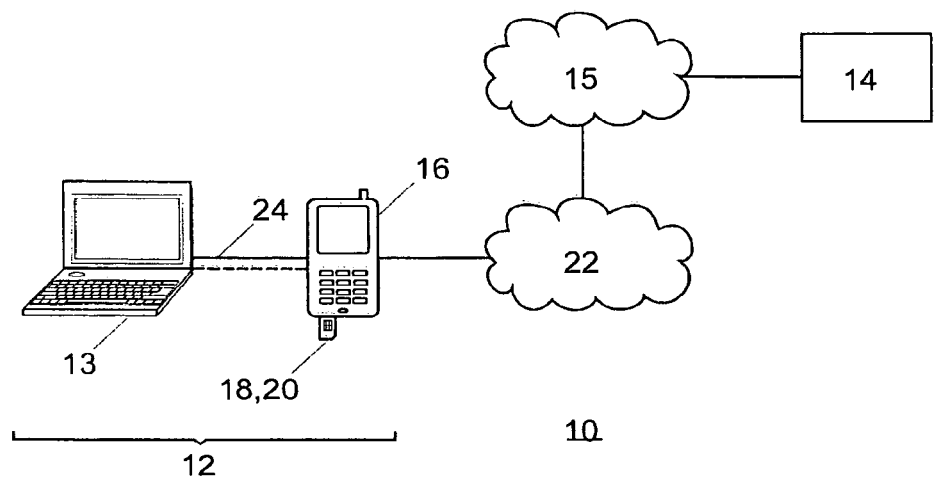
FIG. 1a shows a first embodiment of an overall communication system illustrating one embodiment of the present invention.

Referring first to FIG. 1a, a communication system, shown generally at 10, permits the communication of data between a communication station 12 and an IP network 14. Such a communication system is known from the published patent application WO-A1-01/60013. The IP network 14 may be a private intranet to which access is selectively permitted, or any other type of private data communication network. When the communication station 12 is permitted access to the network 14, data can be communicated between them. Furthermore, a virtual private network as known in detail from WO-A1-01/60013 can be established between the communication station 12 and the network 14.

Figure 1B:
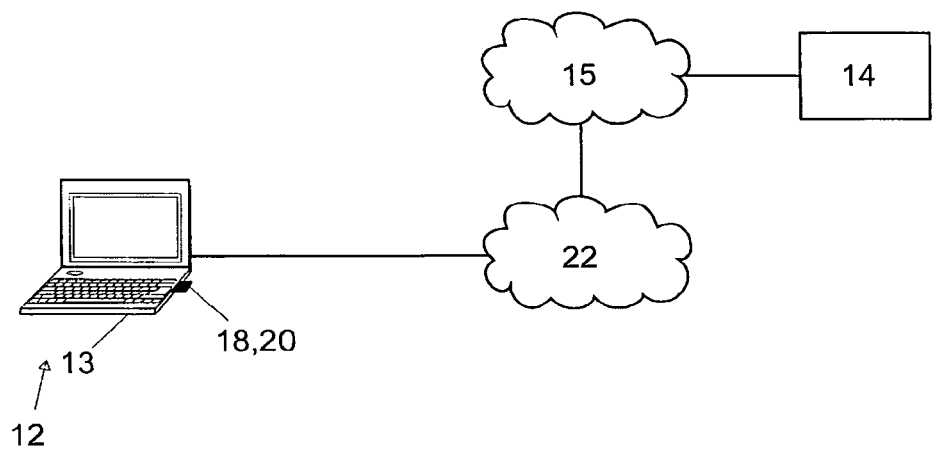
FIG. 1b shows a second embodiment of an overall communication system illustrating one embodiment of the present invention.
Figure 1C:
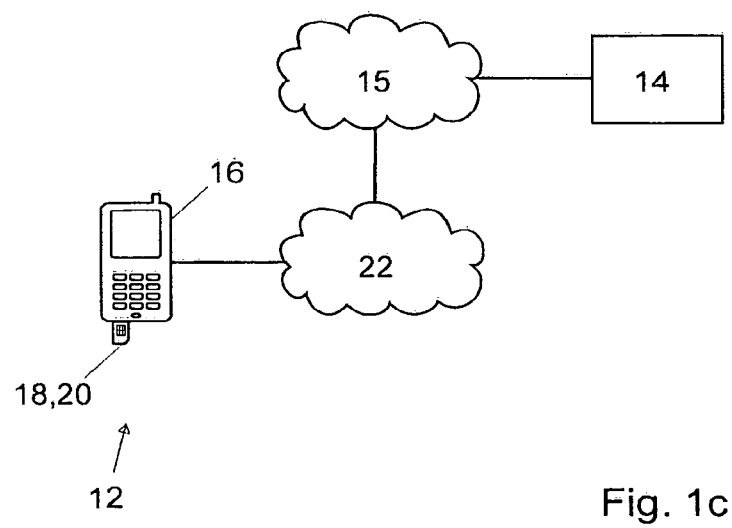
FIG. 1c shows a third embodiment of an overall communication system illustrating one embodiment of the present invention.

In the exemplary embodiment illustrated in the FIG. 1a-c, the communication system 10 comprises a wireless access network, for example a GSM (Global System for Mobile communications) network, to which the IP network 14 is coupled. In other embodiments, the communication system 10 may alternately comprise other structure such as WLAN, a UMTS, a GPRS, an Edge or any other known communication network.

The communication station 12 includes a radio transceiver, for example a mobile station such as a conventional cell phone. The mobile station comprises a mobile terminal 16, here a GSM, WLAN, GPRS, Edge or UMTS equipment, and an identification module 18, here a Subscriber Identity Module (SIM) card, which is inserted into, or is otherwise connected to the mobile terminal 16. Other kind of identification modules, including USIM used in UMTS networks, or virtual identification modules, comprising only software components, may be used.

The identification module includes a storage location 20 for storing subscriber authentication information for authenticating the module within the cellular communication system 22, in conventional manner. The identification module may further include a storage location for storing the address of the private IP network 14.

In the embodiment of FIG. 1a, the mobile station 16 is coupled to a computer 13 by a wired or wireless link, for example over an infrared coupler, by means of Bluetooth, ZigBee, NFC, Home RF or any other suitable means. The computer may be a portable personal computer running an Internet client, for example a Web browser, an email client, etc. In the embodiment of FIG. 1b, the mobile terminal 16 is in the form of a removable card, such as a PC-Card, inserted in a suitable slot of the computer 13, the identification module being itself inserted in the removable card.

In the embodiment according to FIG. 1c, the mobile terminal 16 and the computer 13 are integrated in the form of a single piece of equipment, for example a smartphone or a PDA with an interface for a cellular network. The identification module will then be directly inserted in this equipment.

The computer 13 may also be connected directly to the internet over a link, not illustrated, for example a modem, a network card, a router, etc. independent from the mobile station 16.

In the embodiment in which portions of the communication system 10 are formed of a structure of a GSM communication system, such structure, as well as the air interface formed between the remote communication station 12 and the private IP network 14, are defined by the specification standards of the GSM system.

During operation, when a user of the computer desires to access the private IP network 14, appropriate commands are generated at the computer to initiate a request for access to the private IP network 14 over the cellular network 22.

According to the present invention, the access control policy, as defined by the security settings, of the communication station 12 depends on security relevant events identified, handled and/or retrieved in the identification module 18. In particular, access by the computer 13 and/or by the mobile terminal 16 to some data, such as credentials, or applications in the identification module 18 depends on those security relevant events, as stored in a security registry of the identification module.

Figure 2:
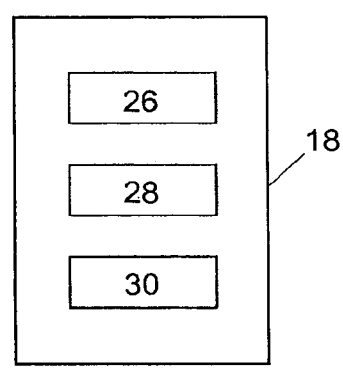
FIG. 2 shows the structure of an identification module according to the present invention.

FIG. 2 shows in a schematic way the inventive identification module 18, which comprises besides conventional features an event handler 26, an event registry 28 and a security registry 30.

According to the invention, security relevant events are recognized by the event handler 26 of the identification module 18. According to the present invention, a "security relevant event" comprises one or a plurality of the following actions, which are carried out by the user or any application: change in the hardware configuration of said communication station 12 or mobile terminal 16, connection of said communication station 12 or mobile terminal 16 to an external network or system, event generated by an application executed by said communication station 12 or mobile terminal 16 and event transmitted over-the-air to said communication station 12. Some of the possible actions are creating, releasing losing or closing access channels from and to the communication station 12 (e.g. IPSec VPN tunnel), locking or unlocking workstation 12 status, removing or installing hardware or software components (new network/connectivity interfaces or peripherals, new network/connectivity drivers or applications), an auto run from a device (CD-ROM, DVD, USB, etc.) and detecting malicious or suspicious content (antivirus software), traffic (existing firewall) or modifications (host-IDS), etc. Of course, this is no complete list of all possible events; they are given merely by way of illustration and the invention is by no means restricted to these examples. Any other event, which could do harm or be relevant the user, to the communication station 12 or the mobile terminal 16 could be used. An additional Internet access 15 or WLAN access on a hot spot as mentioned above could be taken into account as well. The user login status and/or the status of a connection channel implying said communication status could be taken into account as well.

The event could either be relevant for the communication station 12 and for the mobile terminal 16 or only for one those devices. Moreover, the security policy may be used to define restrictions for applications in the communication station 12 and/or in the mobile terminal 16.

The event could be identified by an event handler 27 in the mobile terminal, which could be provided in addition to or in replacement of the event handler 26 in the identification module 18 in the communication station 12 (FIG. 4). In this embodiment, the event will be notified by the communication station event handler 27 to the event handler 26$_1$. of the identification module. Security relevant events are preferably identified with one or a plurality of the mandatory fields such as event identifier, event type, date and time and/or sequence number and optional fields such as event critical level or event type-specific additional information.

After having identified an event and stored the event in an event registry 28, a security registry 30 is preferably also updated. The security registry 30 sets all security settings of the communication station 12 and/or of the mobile terminal 16. The security settings preferably also determine the authentication requirements for applications run by said identification module 18, by said mobile terminal 16 and/or by the computer 13. Said security settings, which are set in the security register 30, are used to limit the right(s) of a single, of a group of or of all applications executed by said communication station 12 or mobile terminal 16, especially the right to access to some part or functionalities of the identification module. When the communication station 12 is switched off, the security settings can be stored and they will be reused when the communication station 12 is switched on again.

For a better understanding of the present invention, FIG. 3-7 illustrate different examples of the invention and different embodiments for realizing the present invention.

Figure 3A:
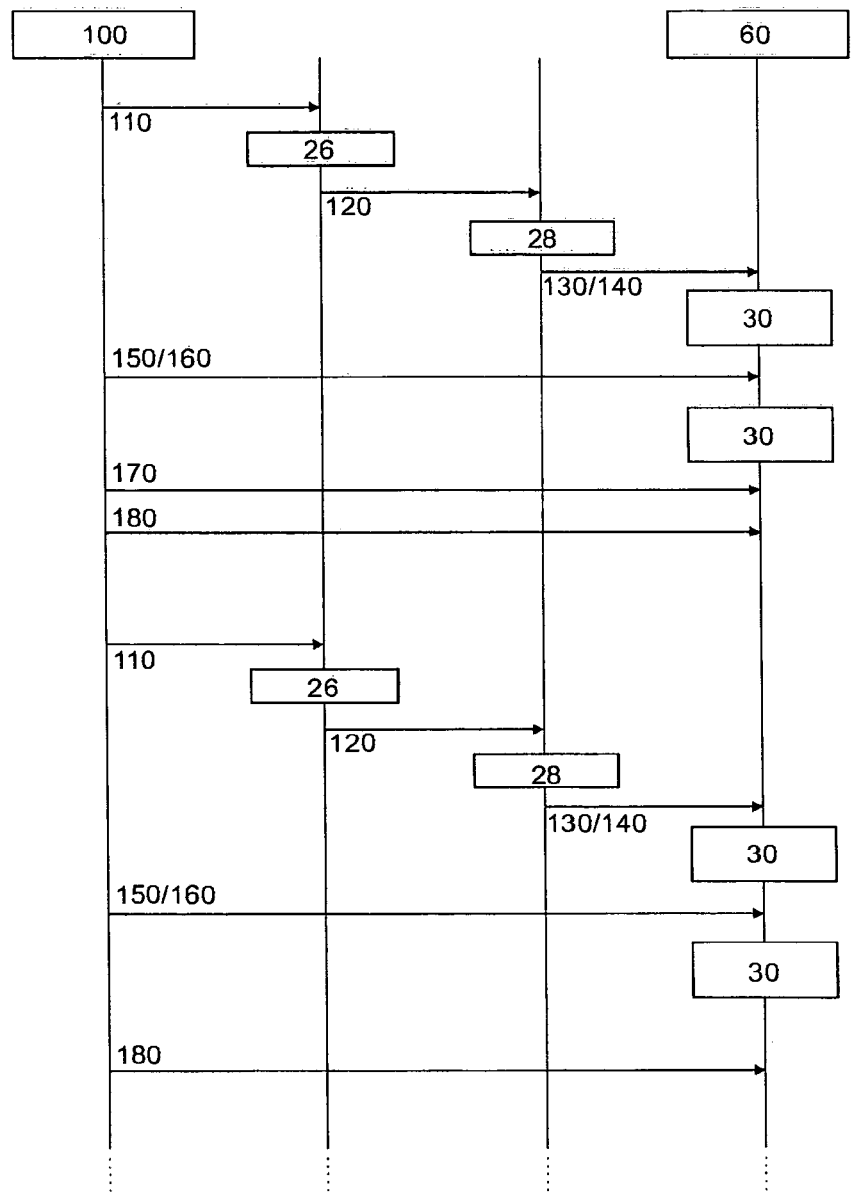
FIG. 3a illustrates a first portion of an example of the invention for authentication for VPN tunnels.
Figure 3B:
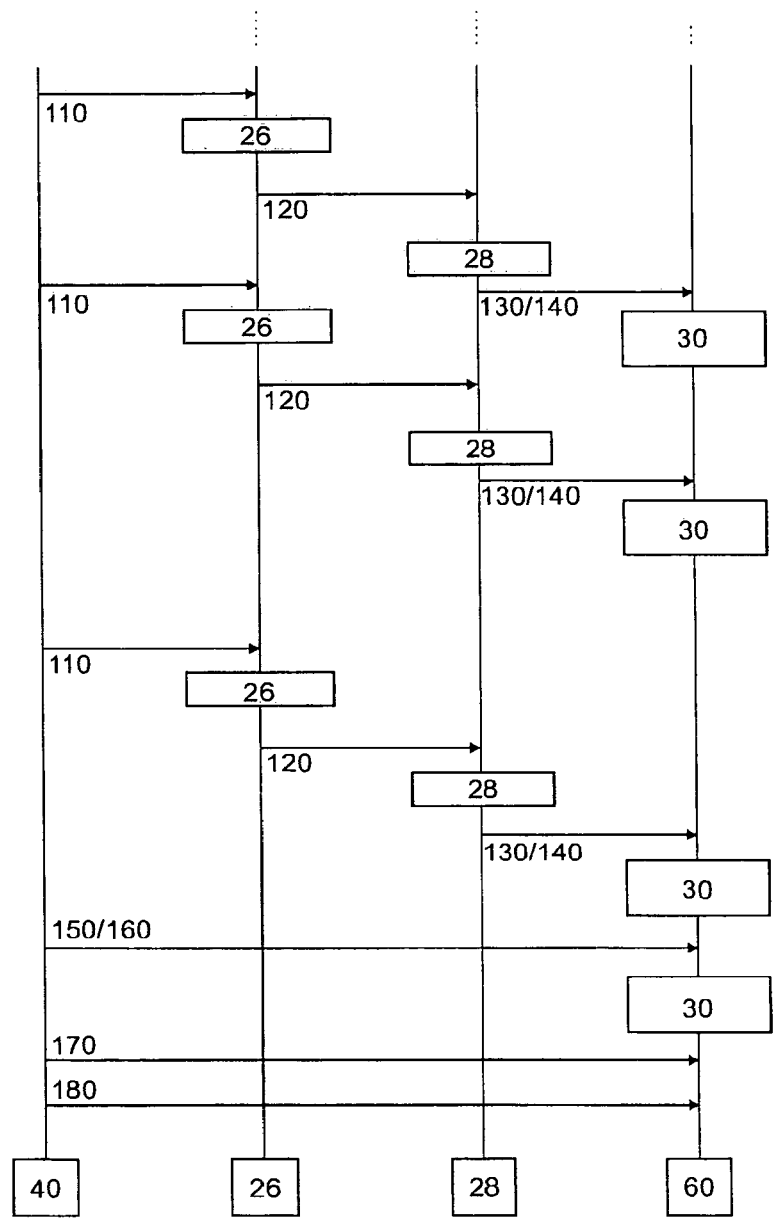
FIG. 3b illustrates a second portion of the example of the invention for authentication for VPN tunnels.

In this respect, FIG. 3 illustrates a method for establishing simultaneous Virtual Private Network (VPN) tunnels, while performing seamless strong authentication using the method of the invention. In this example, a user starts a client application (step 100) in order to establish a secure communication channel, over a VPN through the Internet, with a remote network.

When a first VPN tunnel is opened, this event is identified (step 110) by the event hander 26 in the identification module (or possibly in the mobile terminal or in the computer). The event is then stored in the event registry 28 (step 120). According to the inventive method, the security registry 30 in the identification module 18 is notified (step 130) and updated (step 140) according to the identified event (start of 1 first VPN tunnel). The security mechanisms or security settings of the entire communication station 12 and/or the mobile terminal 16 will depend on the security registry 30 in the identification module 18. The communication station thus looks up (step 150) and verifies this security level (step 160).

In the present example, the software for establishing a VPN connection in the computer 13 looks up (step 150) and verifies this security level (step 160). The settings in the registry require a user authentication, e.g. the entry of a PIN code or the authentication by biometric features (step 170), for a VPN tunnel to be established. After strong user authentication credentials (step 180) have been supplied, they may be stored and/or verified by the identification module 18.

In the situation of FIG. 3, a second VPN tunnel is then started. Again, this event is immediately identified by the event handler 26 (step 110) and, stored in the event registry 28 (step 120). The security registry 30 is then notified (step 130) and updated (step 140). In this case, however, the settings in the registry do not require any further user authentication (step 160), because strong authentication credentials have already been supplied. This results in a seamless establishment of a VPN tunnel for the user.

After having used the communication channels, both VPN tunnels are closed one after the other. Each time, the event is identified by the event handler 26 (step 110) and stored in the event registry 28 (step 120). The security registry 30 in the identification module 18 is notified and adapted accordingly each time (step 130, 140).

When another VPN tunnel is started (i.e. the third VPN tunnel in our example), the same procedure is performed as described above for the first VPN, i.e. identify event by event handler 26 (step 110), store event in registry 28 (step 120), notify and update security registry accordingly (steps 130, 140). Because no VPN tunnel was left and the security register was adapted accordingly, strong authentication credentials as mentioned above are required once more (step 160), e.g. the entry of a PIN code or the authentication by biometric features as described above (step 170).

FIG. 4 illustrates a first embodiment of the invention with one shared event handler 26, event registry 28 and security registry 30 for all applications 60 within the identification module 18. After having started a client application 40 (step 100), the event is identified through the client execution environment 50 by the communication station event handler 27 (step 110), transmitted to the identification module execution environment 70 and the identification module event handler $26_1$ and stored in the event registry 28 of this identification module 18 (step 120). The security level of the communication station 12 is updated within the security registry 30 of the identification module 18 according to the stored event(s) (steps 130, 140). The security mechanisms are used according to applicable security level by communicating between the client application 40 and the SIM card application 60 and by looking up the security level within one shared security registry 30 (steps 150, 160).

FIG. 5 illustrates a second embodiment of the invention with one shared event handler $26_1$ and event registry 28 and a single security registry $30_1$, $30_2$ for one or for a group of application(s) $60_1$, $60_2$. The first step of the embodiment of FIG. 5 corresponds to the first step of the embodiment of FIG. 4, in which after having started a client application 40 (step 100), the event is identified through the client execution environment 50 by the communication station event handler 27 (step 110), transmitted to the SIM Card execution environment 70 and the event handler $26_1$ and stored in the event registry 28 of said identification module 18. Again, the security level of the communication station 12 is updated within one security registry $30_1$, $30_2$ of one or a group of application(s) $60_1$, $60_2$ of the identification module 18 according to the stored event(s) (steps 150, 160).

FIG. 6 illustrates a third embodiment of the invention with one shared event handler $26_1$ for all applications $60_1$, $60_2$ with the identification module 18. The procedure is essentially the same as outlined in FIGS. 4 and 5 according to the basic principles of the present invention with the steps 100 to 160 as described above. However, in FIG. 6 a single event registry $28_1$, $28_2$ and security registry $30_1$, $30_2$ are provided for one or for a group of application(s) $60_1$, $60_2$.

FIG. 7 illustrates a fourth embodiment of the invention similar to the shown embodiments according to FIGS. 4, 5 and 6. In this embodiment, one or a group of applications $60_1$, $60_2$ have a single event handler $26_1$, $26_2$, event registry $28_1$, $28_2$ and security registry $30_1$, $30_2$.

The advantage with the present invention is that it provides a reasonable balance between security requirements and ease of use and seamlessness needs. The appropriate access to and use of sensitive credentials and functions on the SIM card might depend on specific events occurring in the external execution environment. The access control mechanisms on the SIM card will be adapted to these specific events.

REFERENCE NUMBERS

10 Communication system
12 Communication station
13 Workstation
14 IP network
15 Internet
16 Mobile terminal
18 Identification module of the mobile terminal 16
20 Storage location
22 Cellular communication system
24 Communication line
26 SIM Card event handler
$26_1$, $26_2$ SIM Card event handler per SIM card application(s) $60_1$, $60_2$
27 Communication station event handler
28, $28_1$, $28_2$ Event registry
30, $30_1$, $30_2$ Security registry
40 Client application 50 Client execution environment
60, 60₁, 60₂ SIM Card application
70 SIM Card execution environment
100-170 Different steps of the inventive method
100 Start client application
110 Identify event by the event hander 26
120 Store event in the event registry 28
130 Notify security registry 30
140 Update security level in the security registry 30
150 Address SIM card application 60
160 Look up or verify security level in security registry 30
170 User authentication
180 Fulfill use conditions specified by security registry 30 for SIM card application 60

What is claimed is:

1. A method comprising:
storing identification information associated with a security relevant event in an identity module associated with a mobile device;
authenticating a user via a biometric input to the mobile device;
establishing, via the mobile device, a secure near field communications (NFC) channel for communicating with a network; and
accessing, via the mobile device, the NFC channel upon detection of the security relevant event, wherein the security relevant event comprises a hardware configuration change in the mobile device.

2. The method of claim 1, wherein the identity module is a subscriber identity module (SIM).

3. The method of claim 1, further comprising identifying the security relevant event, wherein the security relevant event is initiated by the network.

4. The method of claim 1, further comprising identifying the security relevant event with one or more of: an event identifier, an event type, a date, a time, a sequence number, an event critical level, or an event type-specific additional information.

5. The method of claim 3, further comprising storing information relating to the security relevant event in an event registry in the identity module.

6. The method of claim 1, further comprising restricting access to the identification module by other components of the mobile device.

7. The method of claim 1, wherein the method comprises determining, based on the security related event, access to credentials relating to the user.

8. The method of claim 1, further comprising storing, in the identification module, information relating to the security relevant event.

9. The method of claim 1, wherein the security relevant event comprises at least one of installation or removal of at least one hardware component on the mobile device.

10. The method of claim 9, wherein the at least one hardware component comprises at least one of a network interface, a connectivity interface, a peripheral, a network driver, or a connectivity driver.

11. A system comprising:
a mobile device; and
an identification module associated with the mobile device, wherein:
the identification module is operable to store identification information used in near field communications (NFC);
the identification module is operable to store information associated with a security relevant event;
the mobile device is operable to authenticate a user via a biometric input;
the mobile device is operable to establish a secure NFC channel for communicating with a network; and
the mobile device is operable to access a NFC channel upon detection of the security relevant event, wherein the security relevant event comprises a hardware configuration change in the mobile device.

12. The system of claim 11, wherein the identity module is a subscriber identity module (SIM).

13. The system of claim 11, wherein the mobile device is operable to identify the security relevant event, and the security relevant event is initiated by the network.

14. The system of claim 11, wherein the mobile device is operable to identify the security relevant event according to one or more of: an event identifier, an event type, a date, a time, a sequence number, an event critical level, or an event type-specific additional information.

15. The system of claim 11, wherein the mobile device is operable to store information relating to the security relevant event in an event registry in the identity module.

16. The system of claim 11, wherein the mobile device is operable to restrict access to the identification module by other components of the mobile device.

17. The system of claim 11, wherein the mobile device is operable to determine, based on a security related event, access to credentials relating to the user.

18. The system of claim 11, wherein the mobile device is operable to store, in the identification module, information relating to a security relevant event.

19. The system of claim 11, wherein the security relevant event comprises at least one of installation or removal of at least one hardware component on the mobile device.

20. The system of claim 19, wherein the at least one hardware component comprises at least one of a network interface, a connectivity interface, a peripheral, a network driver, or a connectivity driver.

* * * * *